United States Patent [19]

Perry

[11] Patent Number: 4,761,810
[45] Date of Patent: Aug. 2, 1988

[54] PROGRAMMABLE SELECTIVE RINGING CIRCUIT AND METHOD FOR PARTY TELEPHONE LINE

[75] Inventor: Steven B. Perry, Highlands, N.J.
[73] Assignee: Keptel, Inc., Tinton Falls, N.J.
[21] Appl. No.: 921,599
[22] Filed: Oct. 21, 1986
[51] Int. Cl.[4] .......................................... H04M 13/00
[52] U.S. Cl. .................................. 379/181; 340/825.43
[58] Field of Search ............... 379/177, 178, 179, 180, 379/181, 252, 253, 254; 340/825.38, 825.4, 825.43

[56] References Cited

U.S. PATENT DOCUMENTS 4,587,380 5/1986 Curtin ................................. 379/181

Primary Examiner—Stewart J. Levy
Assistant Examiner—Lawrence G. Fess
Attorney, Agent, or Firm—R. Gale Rhodes, Jr.

[57] ABSTRACT

An apparatus and method for decoding ringing signals on a party telephone line coupled to the telephone line and a telephone instrument, according to the polarity of a d.c. voltage level present across the telephone line upon which ringing signals are superimposed and according to the grounded state of the telephone line. The apparatus comprises a discrimination circuit which supplies a selected one of the ringing signals to the telephone instrument via a ringing signal path to actuate the ringer of the telephone instrument. The apparatus further comprises a ringing signal rectification circuit connected to the telephone instrument via a voice signal path for preventing the ringing signal present on the telephone line from activating a ringer of the telephone instrument via the voice signal path. A switching circuit selectively connects the telephone instrument to the ringing signal path and the voice signal path. The apparatus further preferably comprises a circuit for eliminating bell taps and a balancing circuit for balancing the impedance across telephone line when the d.c. voltage level on the telephone line falls below a preset threshold, thereby forcing semiconductor devices on the line which could contribute to noise problems when only in a partly conductive state, into a conductive state, thereby eliminating the noise.

23 Claims, 4 Drawing Sheets

FIG. 4

| PARTY | SWITCHES A/B | C/D | E/F | G/H |
|---|---|---|---|---|
| (1) −R | X | | | X |
| (2) −T | | X | | X |
| (3) +R | | X | X | |
| (4) +T | X | | X | |

X = SWITCH ON

PROGRAMMABLE SELECTIVE RINGING CIRCUIT AND METHOD FOR PARTY TELEPHONE LINE

BACKGROUND OF THE INVENTION

The present invention relates to telephone equipment and in particular, to telephone equipment for providing an incoming ringing signal to the proper party on a party telephone line. In particular, the present invention relates to a programmable selective ringing circuit for party telephone lines wherein provision of the ringing signal to the proper party is accomplished by polarity decoding of the incoming ringing signal.

Various schemes are known for the decoding of ringing signals on party telephone lines. The present invention relates to a system wherein decoding of the ringing signal is performed by determining the polarity of the talk battery signal applied to the ring and tip telephone lines upon which the ringing signal is superimposed.

Now that the telephone industry has become deregulated, it is essential to provide a device external to a user's telephone, for use on a party telephone line, for properly decoding a ringing signal on that party telephone line. The reason for this is that telephone customers may now purchase their own telephones and install them. In the case of party lines, a normal telephone instrument would not be able properly to decode the encoded ringing signals on the party telephone line. Accordingly, an external device is necessary to be installed in series with the telephone instrument so that only those ringing signals intended for that particular telephone will be received by that telephone.

SUMMARY OF THE INVENTION

It is an object of the present invention to provide a decoding means for properly decoding ringing signals on party telephone lines.

It is yet still a further object of the present invention to provide a decoding means for ringing signals on party telephone lines which operates by decoding the polarity of the talk battery voltage applied to the telephone lines upon which the ringing signal is superimposed.

It is yet still a further object of the present invention to provide such a decoding means which is relatively noise and transient insensitive.

It is yet still a further object of the present invention to provide such a decoding means which maintains a balanced impedance across the telephone line, thus contributing to reduced noise on the line.

It is yet another object of the present invention to provide such a decoding means wherein the return current for the ringing signal is obtained via a ground connection.

It is yet still another object of the invention to provide such a decoding means which eliminates annoying bell tap signals which often occur during dial pulse coding by other users on the line and which eliminates bell tapping when a ringing signal for another telephone on the line is present.

The above and other objects of the present invention are achieved by an apparatus for decoding ringing signals on a party telephone line coupled to the telephone line and a telephone instrument comprising first means coupled to the telephone line for selectively associating the telephone instrument connected thereto with one of a plurality of different coded ringing signals and for supplying a selected one of the ringing signals to the telephone instrument via a ringing signal path thereby to activate a ringer of the telephone instrument, and second means coupled to the telephone line and connected to the telephone instrument via a voice signal path for preventing the ringing signal present on the telephone line from activating the ringer of the telephone instrument via the voice signal path.

Other objects, features and advantages of the present invention will be apparent from the detailed description which follows.

BRIEF DESCRIPTION OF THE DRAWINGS

The invention will now be described in greater detail in the following detailed description, with reference to the drawings, in which:

FIG. 4 is a chart for use in conjunction with the schematic diagram of FIG. 3 showing how the switches of a discrimination circuit of FIG. 3 are switched for the four different parties shown in FIG. 2.

DETAILED DESCRIPTION

Figure 1:
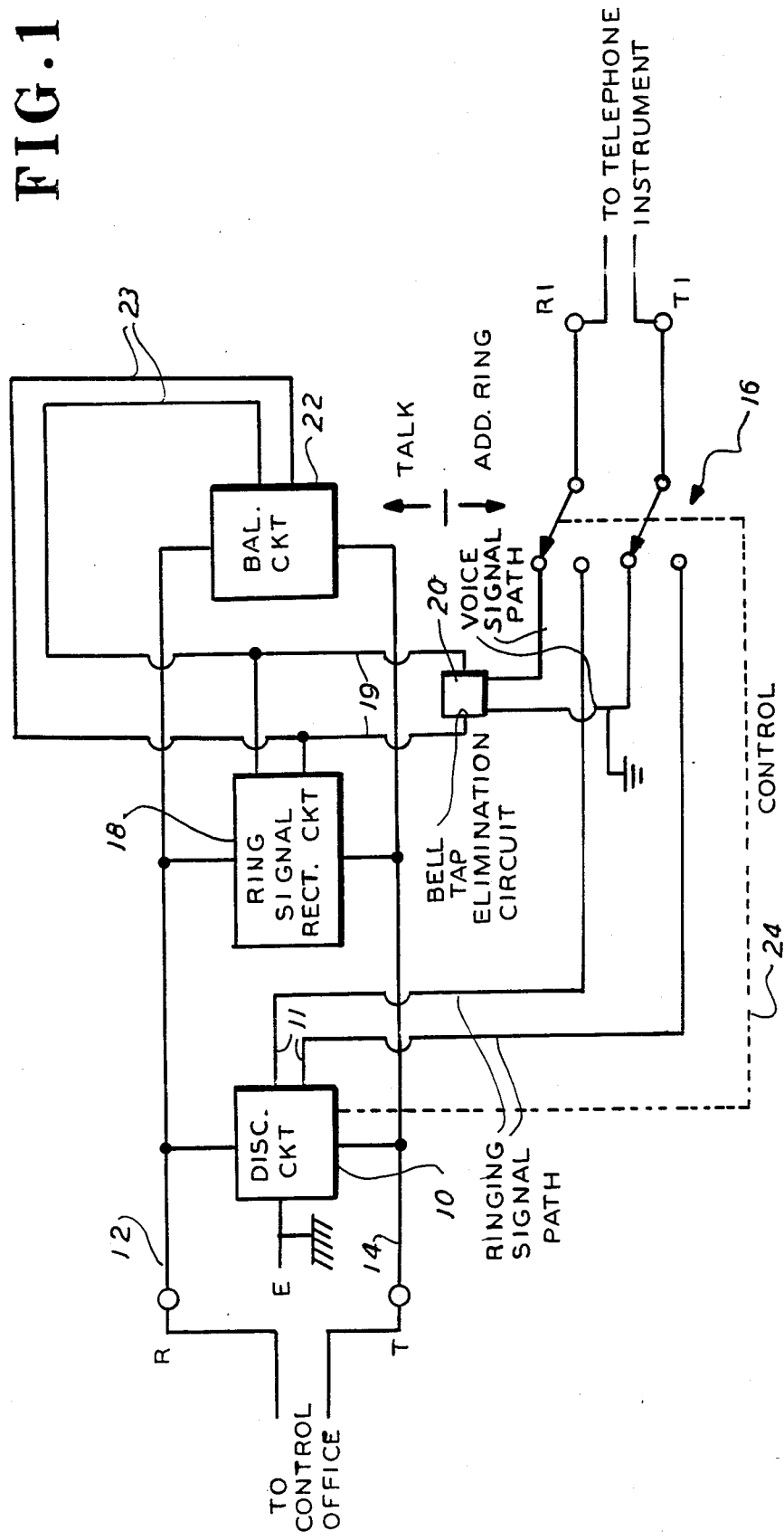
FIG. 1 is a block diagram of the programmable selective ringing circuit for a party telephone line according to the present invention.

With reference now to the drawings, FIG. 1 is a block diagram of the programmable selective ringing circuit according to the present invention. The programmable selective ringing circuit according to the invention comprises a ringing signal discrimination circuit 10 coupled across the ring and tip (R and T) lines 12 and 14 from the central telephone office. The output 11 of the ringing signal discrimination circuit, comprising a signal path for ringing signals present on the R and T telephone lines, is coupled to the normally open contacts of two poles of a switching relay 16. Relay 16 is shown as controlled by line 24, which in the case of a semiconductor device replacing relay 16, might comprise an electrical connection. Further connected to the incoming ring and tip lines is a ring signal rectification circuit 18. The output of the ringing signal rectification circuit, comprising a signal path for voice and other signals, is coupled to the normally closed contacts of relay 16. Coupled across the output 19 of the ringing signal rectification circuit 18 is a bell tap elimination circuit 20, which eliminates a "bell tap" from the bell or electronic ringer of a telephone instrument connected to the R1 and T1 customer premises ring and tip lines when another party is pulse dialing or when a ringing signal addressed to another party is present on the party line. Further coupled to the ring and tip lines from the central office is a balancing circuit 22 which balances the impedance across the telephone lines by connecting the premises wiring and the customer equipment together, thus reducing the amount of noise on the lines. Noise is often introduced by semiconductor devices not being in a fully conductive condition, and also by the premises wiring and customer telephone equipment not being connected to the telephone network in a balanced state. The output 23 of the balancing circuit is coupled across the output 19 of the ringing signal rectification circuit 18. As shown, relay 16 comprises a two-pole, two-throw switch, and the position of the poles is controlled by the discrimination circuit 10 via a control line 24. In the block diagram shown and in the schematic illustrated in the drawings, an electromechanical relay is used, but semiconductor switches could also be used for providing the switching function. Relay 16 is shown in its normal or talk position, i.e., in a position such that a party could pick up the telephone instrument connected to the circuit and dial out. Normal talking and listening is performed via the contacts of relay 16 in the position shown in FIG. 1. Only during an addressed ringing signal (ADD. RING), i.e., a ringing signal intended for the particular telephone connected to the circuit of FIG. 1, do the contacts switch, under control of the discrimination circuit 10, to the other throws of the relay 16. Accordingly, it is only during an addressed ringing signal that the telephone instrument is connected to the output 11 of the discrimination circuit 10 and thus receives and is responsive to a ringing signal. If the ringing signal on the line is not intended for that particular telephone instrument, then the discrimination circuit will not provide an output on control line 24 to switch relay 16 so that the telephone is across the output of the discrimination circuit. At the same time, ringing signal rectification circuit 18 rectifies the ringing signal present on the incoming telephone lines into a d.c. signal to which the ringer of the telephone instrument is not responsive. In order to prevent an annoying bell tap due to unaddressed ringing signals, however, when the rectified ringing signal is present at the output of the ringing signal rectification circuit, as the ringing signal rectified voltage is significantly higher than the normal talk battery voltage existing on the telephone line, the bell tap elimination circuit 20 is provided across the output of the ringing signal rectification circuit. Circuit 20 includes a switching device which also interrupts the output of the rectification circuit 18 in the event of an unaddressed ringing signal or other signals which may cause bell tap. Typically, the talk battery voltage signal is approximately 50 volts, but the ringing signal voltage is significantly higher than that, being approximately 120 volts peak (Bell System Standard). Since the ringing signal is superimposed upon the talk battery voltage, the ringing signal may reach peaks of as much as 170 volts and even higher on some telephone systems which use higher ringing signal voltages. The difference between the talk battery voltage and the peak rectified ringing signal voltage is such that it may be sufficient to generate an annoying bell tap when the voltage changes from the talk battery voltage to the rectified ringing signal voltage. Accordingly, the bell tap elimination circuit 20 is provided to prevent this from occurring.

Figure 2:
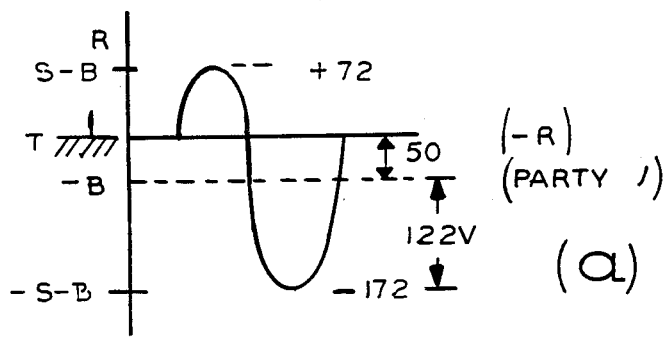
FIG. 2 is a chart showing the manner of connection of the talk battery voltages and the ringing signals to the tip and ring lines of a party telephone line for different parties.
Figure 2:
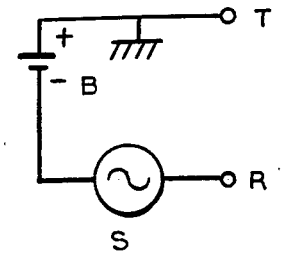
Figure 2:
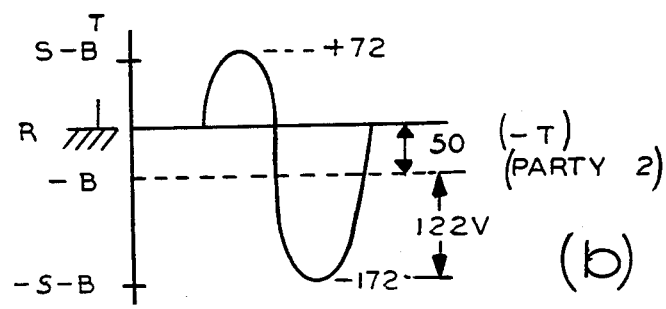
Figure 2:
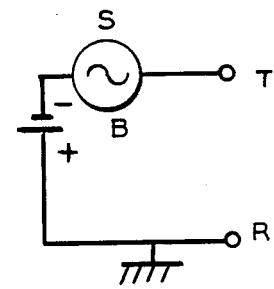
Figure 2:
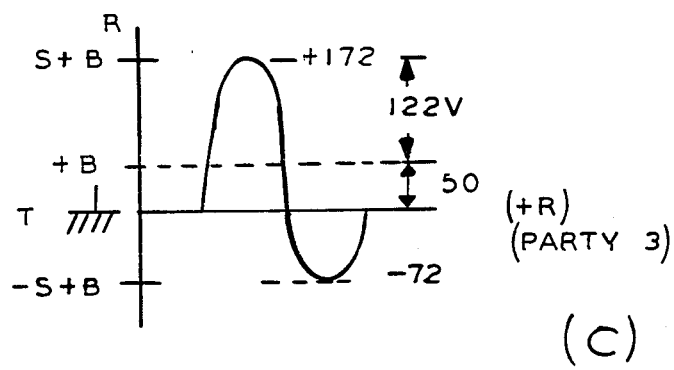
Figure 2:
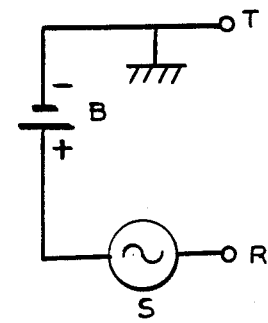
Figure 2:
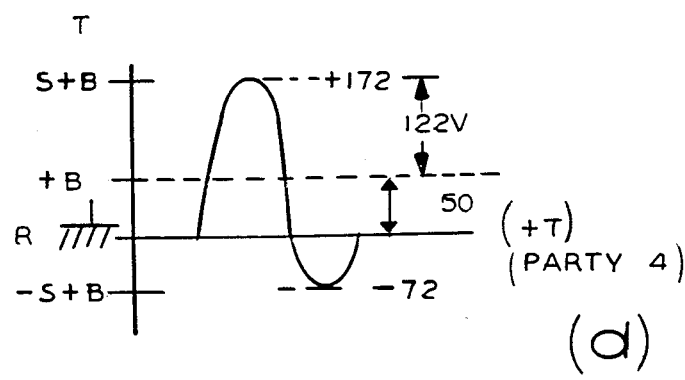
Figure 2:
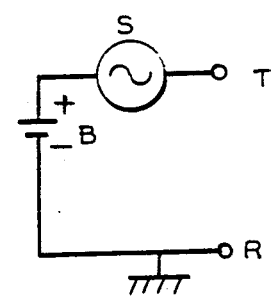

FIG. 2 shows the various talk battery voltages and ringing signal voltages existing on a party telephone line for four different parties, identified as the −R, −T, +R and +T parties, or, respectively, party 1, party 2, party 3 and party 4. As shown, a ringing signal intended for the −R party or party 1, is provided such that the tip and ring lines from the central office are polarized such that the talk battery voltage B is provided such that its positive terminal is connected to the tip line and its negative terminal is connected to the ring line. At the same time, the tip line is grounded and the ringing signal is superimposed on the talk battery voltage. Measured with respect to the tip line or ground, the ringing signal appears as shown at (a) for party 1, superimposed on the negative talk battery voltage. Accordingly, according to the Bell System standard, the ringing signal may have a positive peak of +72 volts and a negative peak of −172 volts.

For party 2, or the −T party, the talk battery is polarized such that the positive terminal of the battery is connected to the ring line and the negative terminal is connected to the tip line. The ring line is coupled to ground and the ringing signal is superimposed on the telephone line as shown at (b). Accordingly, the ringing signal may have a positive peak of +72 volts and a negative peak of −172 volts according to the Bell System standard.

The +R and +T parties (parties 3 and 4, respectively) are simply the same as the −R and −T parties, respectively, with the exception that the talk battery voltages are reversed in each case. This is shown in FIG. 2 (c) and (d). Accordingly, +R and +T parties may have positive peaks of as much as 172 volts and negative peaks of −72 volts. In the case of the +R party, the tip terminal is grounded and in the case of the +T party, the ring terminal is grounded.

The circuit according to the invention can properly decode the ringing signals shown in FIG. 2 to the proper parties, and can perform this such that noise signals present on the line are not likely to interfere or cause spurious ringing signals, and also functions in such a way that the circuit according to the invention does not add noise to the party telephone line. This will be explained in more detail with reference to FIGS. 3 and 4.

Figure 3:
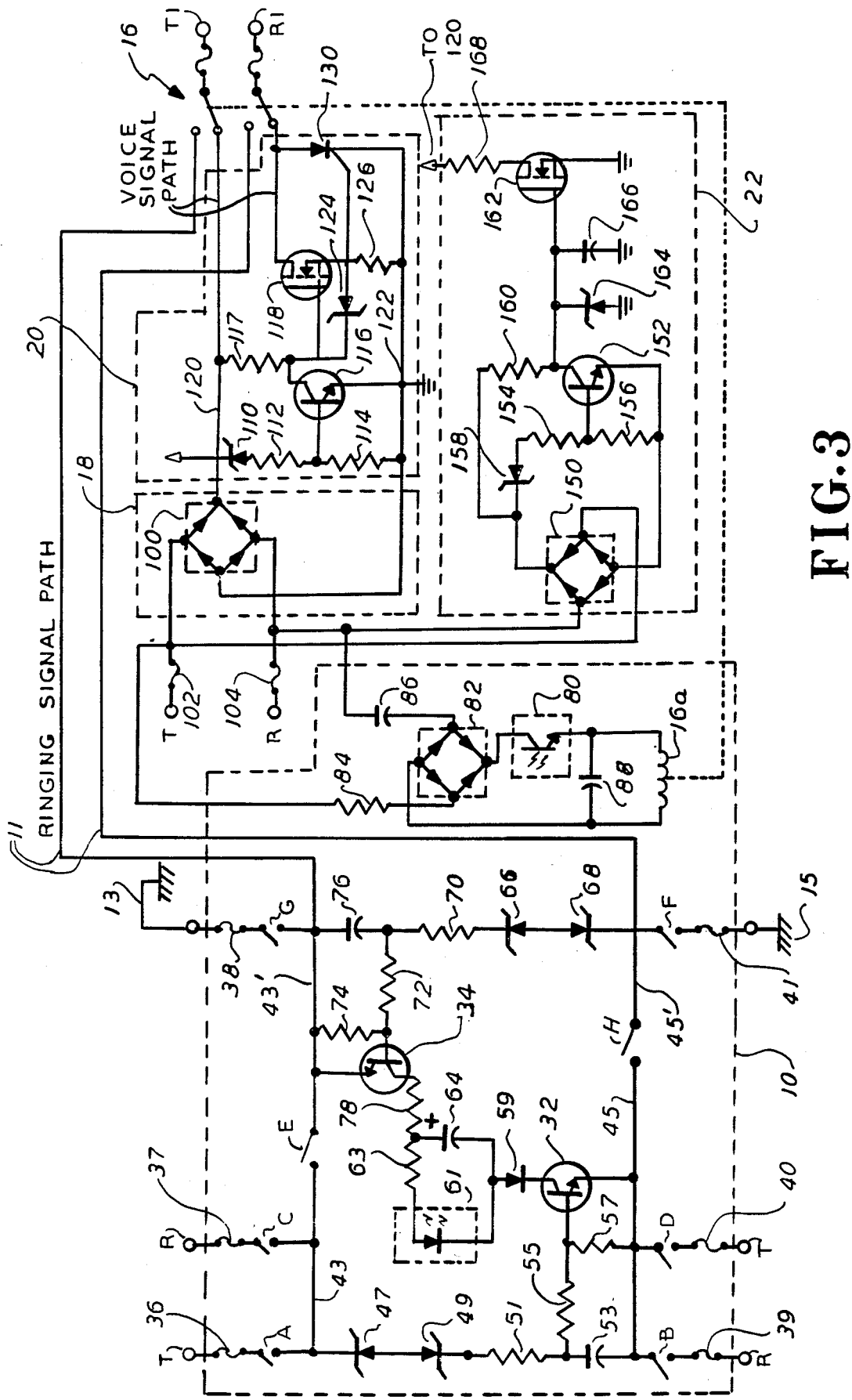
FIG. 3 is a schematic diagram of the programmable selective ringing circuit according to the present invention.

FIG. 3 is a schematic diagram of the programmable selective ringing circuit according to the present invention. The circuits 10, 18, 20, 22 and relay 16 are identified with the same reference numerals as employed with respect to FIG. 1. The pick coil of relay 16 is identified as 16a.

The ring and tip incoming telephone lines are connected to polarity discrimination circuit 10 as shown in FIG. 3. The discrimination circuit 10 is also connected to ground as shown at 13 and 15. One aspect of the invention is that ringing may be and preferably is performed over the telephone line by having a return line through earth ground. Thus, when the ringing signal is present on either the ungrounded ring or tip line, the return path for the ringing signal is made through ground. An earth ground return path is preferable because it provides a typically lower resistance, thus causing less ringing signal attenuation. As shown in FIG. 3, the discrimination circuit comprises a series of switches A, B, C, D, E, F, G and H, which are selectively programmed according to the particular party connected to the R1 and T1 lines of the circuit shown in FIG. 3. The arrangement of switches for a particular party is shown in FIG. 4. Thus, as shown in FIG. 4, for the −R party, or party 1, switches A, B and G and H are turned on. For the +R party, switches C, D and E and F are turned on.

The discrimination circuit 10 further comprises two transistor switches 32 and 34. The ring, tip and ground connection lines to the discrimination circuit may be connected to the circuit by suitable protective fuses 36 through 41 as shown. The discrimination circuit comprises first and second buses 43, 43' and 45, 45' which are connected by respective switches E and H. Connected between buses 43 and 45 is a series circuit comprising two zener diodes 47 and 49 connected opposite one another. Also connected in series with the zener diodes is a resistor 51 and capacitor 53. Capacitor 53 is coupled to resistors 55 and 57 and then to the base of transistor 32. Switches C and D are also connected to respective buses 43 and 45. The collector of transistor 32 is connected through a diode 59 through an optical coupling circuit 61 comprising a light emitting diode, for example. Resistor 63 and capacitor 64 are connected in parallel across the LED 61.

Switches F and G are connected to respective buses 43' and 45' and are also connected together via series connected zener diodes 66 and 68 connected opposite one another. A resistor-capacitor stage comprising resistors 70, 72 and 74 and capacitor 76 is connected to the series connected zener diodes 66 and 68 and thence to transistor 34. The collector of transistor 34 is connected via a resistor 78 to capacitor 64 which is then coupled to transistor 32 via diode 59.

The operation of discrimination circuit 10 can now be explained. As is evident, LED 61 can only be placed into a conductive condition when both switches 32 and 34 are conductive and the proper polarities exist at the ring, tip and earth ground terminals connected to the discrimination circuit. Accordingly, depending upon the selection of switches A through H, the telephone instrument connected to the circuit of FIG. 3 will be uniquely determined as one of the four possible parties, and only a ringing signal identified with that party will allow the telephone instrument to ring.

As an example, suppose it is desired that the telephone instrument connected to the circuit of FIG. 3 is the −R party or party 1. Accordingly, switches A, B and G and H, as shown in FIG. 4, are turned on. Switches C, D and E and F are turned off. Suppose a ringing signal for the −R party is supplied on the telephone line. Accordingly, as shown in FIG. 2, the tip line is grounded and the talk battery is connected such that it is polarized such that the ring line is negative with respect to the tip line. The ringing signal is superimposed on the talk battery voltage as shown in FIG. 2. Accordingly, the d.c. level of the ring line is negative with respect to the tip line. The d.c. level is insufficient to break over zener diode 47, but zener diode 49 would be placed in a conductive condition if zener diode 47 avalanched, which it will not due to the insufficient d.c. level. Accordingly, no current flows between buses 43 and 45 in the absence of a ringing signal. When the ringing signal appears, however, the ringing signal will develop a sufficiently negative voltage on the ring line to break over zener diode 47. Accordingly, current is conducted between buses 43 and 45. After a delay, capacitor 53 will charge up to a sufficiently high voltage, thus turning transistor 32 on. Zener diodes 47 and 49 may, in the illustrated circuit, be rated at 68 v.

At the same time, switches G and H are turned on. Accordingly, the emitter of transistor 34 is connected to ground and a conducting path is provided through switch H and resistors 70, 72 and 74 and diodes 66 and 68 to the ring terminal. Since the ring line is negative with respect to ground, as shown in FIG. 2, and, when a ringing signal occurs on the line, zener diode 66 will break over, with zener diode 68 being in a conductive condition, a current path also exists between terminals 43' and 45'. Thus, after a time delay, capacitor 76 will charge up to a sufficiently negative voltage such that transistor 34 will be placed in a conducting condition. Accordingly, light emitting diode 61 will be placed in a conducting condition with its anode approaching ground and its cathode approaching the negative ring voltage.

Light emitting diode 61 thus emits light which is received by phototransistor 80. Capacitor 64 maintains LED 61 in a conductive condition during the nonconducting half cycle of the ringing signal. Phototransistor 80 is connected across a bridge circuit 82 which is connected to the ring and tip lines via a resistor 84 and capacitor 86. Accordingly, the time varying ringing signal is conducted through the capacitor 86, with the d.c. talk battery voltage level being suppressed by the capacitor. A filter capacitor 88 filters the the ringing voltage and the rectified filtered ringing voltage is then applied to the pick coil 16a of relay 16 thus to switch the telephone instrument to the ringing signal path 11. Ringing is performed by a return current through earth ground, for example, for the −R party, through switch G, with the ringing signal present on line R.

In the event that a nonaddressed ringing signal is present on the telephone line, for example, a +R ringing signal is present, one will find that light emitting diode 61 will not be placed in a conductive position, and accordingly, the rectified ringing signal will not be coupled to the pick coil of relay 16A. For example, suppose the +R ringing signal is present on the telephone lines. As shown in FIG. 2, for the +R party, the tip line is again grounded at the central office but the talk battery voltage is polarized such that the ring line is positive with respect to the tip line. If the telephone instrument is programmed to be the −R party or party 1, then switches A, B and G and H are turned on, as before. As is evident from FIG. 2, transistor 32 can only be placed into conduction if its base is sufficiently positive with respect to its emitter. Whenever the ring terminal is positive with respect to the tip line, transistor 32 can never be placed in a conductive position. When the ringing signal goes negative below the tip line, however, it goes negative to an insufficient level to allow zener diode 47 to avalanche and be placed in a conductive condition. Accordingly, transistor 32 cannot be turned on, regardless of whether transistor 34 might be placed in a conductive position.

Similarly, suppose the ringing signal present on the line was the ringing signal intended for the +T party or party 4. Accordingly, as shown in FIG. 2, the ring line would be grounded at the central office and the tip line would be positive with respect to the ring line because of the polarization of the talk battery. When the ringing signal goes positive, the tip line goes even more positive with respect to the grounded ring line. Under these circumstances, transistor 32 could be turned on. However, it will be observed that transistor 34 must be in a nonconductive condition, since switch G connects bus 43' to ground. Since the ring line is also connected to ground, and thus buses 45 and 45' are grounded, transistor 34 cannot be placed into a conductive condition, and accordingly, light emitting diode 61 cannot be turned on and thus the ringing signal which is addressed to the party 4 party is not provided to the party 2 telephone instrument. Accordingly, only the ringing signal for the particular party to which the ringing signal is addressed can be received by the telephone instrument.

Just as a further example, suppose that the circuit of FIG. 3 was programmed for the party 4 party. Accordingly, switches A and B and E and F would be turned on (FIG. 4). As indicated, if the party 4 ringing signal is present on the lines, transistor 32 would be placed in a conductive condition. With switches E and F turned on, then bus 45' is connected to ground and bus 43' is connected to the tip line. When the tip line goes positive over the talk battery voltage, because of the ringing signal present on the line, zener diode 66 will break over and thus conduct and diode 68 will of course be in conducting condition. Accordingly, the base of transistor 34 will approach ground, thus placing transistor 34 in a conductive condition. Since both transistors 32 and 34 are in a conductive condition, light emitting diode 61 will be turned on, and the ringing signal will pick relay 16.

As shown, buses 43' and 45', comprising the output of the discrimination circuit, are coupled to one throw (normally open) of each of the poles of the relay contacts of relay 16, and thus the ringing signal is provided to the telephone instrument once relay coil 16a is activated.

As discussed earlier, the circuit of the present invention also includes a circuit for insuring that the ringing signal does not activate the telephone instrument through the normal talk path contacts of relay 16 and for eliminating bell tapping. Since it is desirable not to switch the normal talk path of the telephone instrument, but only switch the telephone instrument for an addressed ringing signal, a nonaddressed ringing signal, i.e., a ringing signal not intended for that particular party, must be removed from the line or placed into a condition such that it does not affect the telephone instrument, as the telephone instrument is normally connected to the ring and tip lines via the voice signal path comprising a second rectifier bridge 100 comprising ringing signal rectification circuit 18 and further comprising circuit 20. As shown, ringing signal rectification circuit 18 is connected across the ring and tip lines via protective fuses 102 and 104. When a ringing signal is present, it is rectified by rectifier bridge 100. It is provided to the bell tapping elimination circuit 20, which comprises a zener diode 110 connected in series with resistors 112 and 114 and further transistors 116 and 118 and SCR 130. Transistor 118 and SCR 130 comprise a part of the talk path between the telephone instrument and the incoming telephone lines. Normally, the positive talk battery voltage present on the tip and ring lines, no matter what the polarity of the voltage on the lines, will be provided to a bus 120 of the bell tap elimination circuit by bridge 100. Thus, approximately 50 volts will be present on bus 120. This will keep transistor 118, which may be an FET, in a conductive condition, thus providing a talk path through the FET and resistor 126 when the handset is lifted. Bus 122 is grounded to chassis ground (not earth) as shown. A zener diode 124 is provided between the gate and source of FET 118 for voltage protection. The conductive path through the FET is completed through resistor 126. SCR 130 is coupled across the field effect transistor 118 as shown, and protects transistor 118 in the event of voltage surges by providing a current shunt for FET 118.

Once a ringing signal is present on the telephone lines, whether an addressed or non addressed ringing signal, the ringing signal will be rectified by rectifier bridge 100 and limited to a safe maximum voltage by zener diode 110. In the illustrated embodiment, zener diode 110 may comprise a zener diode having a breakover voltage of 100 volts. Accordingly, bus 120 is limited to 100 volts, even when the ringing signal is present. As discussed above, with respect to the ringing signal rectification circuit, it makes no difference whether the ringing signal is addressed or unaddressed, since an addressed ringing signal will be coupled to the telephone by the discrimination circuit 10 operating relay contacts 16. Accordingly, an addressed ringing signal will be coupled to the telephone via the upper contact pair of relay contacts 16. At the same time, the ringing signal is converted to a d.c. signal by the rectifier bridge 100 and limited by the zener diode 110. Transistor 116 is placed into a conductive condition by the presence of a ringing signal, which thus connects the gate of the field effect transistor 118 to approximately a ground potential. Therefore, field effect transistor 118 is turned off in the event of a ringing signal. Thus, if the ringing signal is unaddressed, the ringing signal will be rectified, limited to a voltage which is insufficient to cause bell tap and prevented from reaching the telephone via the normal talk path (normally closed contacts of relay 16) by the off condition of transistor 118. Also, since the ringing signal is unaddressed, relay 16 is not energized, and thus the telephone is not connected to the ringing signal path 11. At the same time, zener diode 110 limits the maximum voltage across bus 120 and ground, and thus across the telephone and transistor 118, to a safe maximum voltage. This has the effect that the change in voltage between the talk battery level and the rectified ringing signal voltage is also limited to an amount insufficient to cause bell tap, in the illustrated embodiment, approximately 50 volts. This change in voltage is insufficient as a transient to activate the ringer of the telephone, whether it is an electromechanical ringer or an electronic ringer, and thus prevents an annoying bell tap at the instant that the ringing signal occurs. At the same time, it also prevents other transients on the line, for example, from pulse dialing by another party on the line, from affecting the ringers of any other parties.

If the ringing signal is an addressed ringing signal, circuits 18 and 20 operate in the same way as for an unaddressed ringing signal, but discrimination circuit 10 will operate relay 16 so that the telephone will be responsive to the ringing signal on lines 11.

One further circuit is provided according to the present invention, a balancing circuit 22 for balancing the impedance across the ring and tip lines. In the circuit according to the present invention, the talk path is provided through two of the diodes of rectifier bridge 100 and also through the source-drain path of transistor 118. When the handset of the telephone instrument is lifted, transistor 118 is placed into a conductive condition due to the talk battery voltage. However, if the talk battery voltage at the telephone falls below a preset level, the semiconductor devices and the diodes of bridge 100 may conduct insufficiently and can provide semiconductor noise onto the telephone lines. This noise can often be heard by any party on the line who is using a telephone and is caused by the other telephone units on the party line which are not being used, i.e., the other devices according to the invention coupled to the line. But for the provision of the balancing circuit 22 according to the invention in these other devices, these devices would generate noise on the party line when the associated telephones are not in use. Accordingly, in order to prevent this, a balancing circuit is provided which is connected across the output of rectifier bridge 100. The balancing circuit comprises a third rectifier bridge 150 connected across the ring and tip lines. The outputs of the rectifier bridge are coupled to a transistor switch 152 via a resistor divider comprising resistors 154 and 156 and a zener diode 158. The collector of transistor 152 is connected to the output of the bridge via a resistor 160. The collector of transistor 152 is also connected to the gate of a field effect switching transistor 162, whose gate is protected via a zener diode 164. Capacitor 166 provides a delay so that test equipment will not activate transistor 162. The source-drain path of FET 162 is coupled across the output of rectifier bridge 100 of the ringing signal rectification circuit 18, via a termination impedance comprising resistor 168.

The operation of the balancing circuit can now be explained. The normal talk battery voltage present on the ring and tip telephone lines will be sufficient to place transistor 152 into a conductive condition. The resistor voltage divider comprising resistors 154 and 156 may, for example, comprise a resistor 154 comprising a 10 meg ohm resistor and resistor 156 comprising a 1 meg ohm resistor with zener diode 158 comprising a 12 volt break-over zener. Thus, if transistor 152 conducts transistor 162 is kept in a non-conductive condition. However, if the talk battery voltage falls below approximately 18 v, as set by zener diode 158, transistor 152 will turn off, thus shunting the talk battery voltage to the gate of transistor 162 via resistor 160, and thus, transistor 162 is placed in a conductive condition. Zener diode 164 limits the gate voltage to a safe voltage and prevent transients from damaging the transistor 162. Accordingly, an impedance comprising the impedance of the field effect transistor 162 in its on state and the impedance of resistor 168, which may be approximately 20,000 ohms, is placed directly across the output of rectifier bridge 100 in the event of low talk battery voltage caused by the telephone line being in use. Accordingly, a fixed impedance is placed across the rectifier bridge, thus maintaining two of the diodes of the bridge in the conductive condition, and eliminating any noise which might be provided on the telephone lines by any of the semiconductor devices of circuit 20. Furthermore, the fact that two of the diodes in the rectifier bridge 100 are in a fully conductive condition will eliminate substantially any semiconductor noise which could be provided on the telephone lines by these diodes. Because two diodes of bridge 100 are fully conductive the premises wiring and customer telephone equipment are coupled to the line in a balanced fashion. Accordingly, the impedance across the tip and ring lines from all the parties on the telephone line is approximately balanced for each party, comprising one diode drop through one line and one diode drop and the FET 162 drain-source drop through the other line, terminating in a fixed impedance 168.

If balancing circuit 22 were not used, then when the talk battery voltage was low, the only slightly conductive diodes of bridge 100 and the other devices in circuit 20 for those telephones not being used would place noise on the telephone line.

When a ringing signal occurs, zener diode 158 will also be placed into a conductive condition and transistor 152 will be turned on, thus turning off field effect transistor 162. The reason for this is that it is not desired to load down the telephone line during a ringing signal. Capacitor 166 prevents transistor 162 from being placed in a conductive condition during a ringing signal. Resistors 112, 114 and 117 are also sized so that they do not present a low impedance during a ringing signal or any other time. Resistor 112 may, for example, be 1 meg ohm, resistor 114 100 K ohms, and resistor 117 may be 10 meg ohms. Resistor 126, since it is in the talk path, comprises a low resistance, for example, 4.7 ohms. Resistors 154 and 156 are, illustratively, 10 M ohms and 1 M ohms and resistor 160 is 10 M ohms.

Zener diodes 47, 49 and 66 and 68 of the discrimination circuit 10 illustratively comprises zener diodes having a 68 volt breakover voltage. Zener diodes 124 and 164 are illustratively 14 v. and zener diode 158 is illustratively 12 v.

In the foregoing specification, the invention has been described with reference to a specific examplary embodiment thereof. It will, however, be evident that various modifications and changes made be made thereunto without departing from the broader spirit and scope of the invention as set forth in the appended claims. The specification and drawings are, accordingly, to be regarded in an illustrative rather than a restrictive sense.

What is claimed is:

1. Apparatus for decoding ringing signals on a party telephone line coupled to the telephone line and a telephone instrument comprising:

first means coupled to the telephone line for selectively associating the telephone instrument connected thereto with one of a plurality of different coded ringing signals and for supplying said one ringing signal to the telephone instrument via a ringing signal path provided in the decoding apparatus thereby to activate a ringer of the telephone instrument; said first means comprising means for decoding said plurality of ringing signals according to the polarity of a d.c. voltage level present across the telephone line upon which the ringing signals are superimposed and according to a grounded state of one of the two conductors of the telephone line;

second means coupled to said telephone line and connected to the telephone instrument via a voice signal path provided in the decoding apparatus for preventing said ringing signal present on the telephone line from activating the ringer of said telephone instrument via said voice signal path, said second means comprising rectifier means for converting a ringing signal to a direct current signal to which a ringer of the telephone instrument is not responsive; and third means coupled to said second means for limiting a change in voltage level at an output of said second means between said d.c. level on said telephone line and a rectified level of the ringing signal voltage.

2. The apparatus recited in claim 1, wherein said first means further comprises means coupling said telephone instrument and both said ringing signal path and said voice signal path for selectively supplying a ringing signal on said ringing signal path or a signal on said voice signal path to said telephone instrument.

3. The apparatus recited in claim 2 wherein said means for selectively supplying comprises switching means.

4. The apparatus recited in claim 1 wherein said first means comprises switch means for selectively associating a selected one of said ringing signals with said telephone instrument.

5. The apparatus recited in claim 1 wherein said ringing signal path comprises a pair of conductors, one of said conductors coupled to earth ground for providing a return path to a telephone central office for the ringing signal through earth ground.

6. The apparatus recited in claim 2 wherein said first means comprises means for rectifying a ringing signal and switching means for coupling the selected ringing signal to said means for supplying whereby said means for supplying, when activated by said switching means for coupling, will supply said selected ringing signal to said telephone instrument.

7. The apparatus recited in claim 6 wherein said switching means comprises optical coupling means.

8. The apparatus recited in claim 1 wherein said third means further comprises additional switching means for interrupting said voice signal path responsive to a ringing signal.

9. The apparatus recited in claim 6, wherein said first means comprises first and second series connected switching means coupled to said telephone line, said switching means for coupling being coupled in series with said first and second switching means, said switching means for coupling only being activated if both said first and second switching means are rendered conductive by said selected ringing signal.

10. The apparatus recited in claim 9, further comprising time delay means coupled to a control input of each of said first and second switching means, whereby said first and second switching means are substantially unaffected by noise signals on the telephone line.

11. The apparatus recited in claim 2, further comprising means for balancing an impedance across said telephone line when the d.c. voltage level across said telephone line drops below a preset threshold.

12. The apparatus recited in claim 11 wherein said balancing means comprises a terminating impedance and means for switching said terminating impedance across an output of said second means.

13. The apparatus recited in claim 12, wherein said balancing means further comprises means for supplying said d.c. voltage level on said telephone line to said means for switching said terminating impedance comprising further switching means responsive to said d.c. voltage level, whereby, if said d.c. voltage level falls below said preset threshold, said terminating impedance is provided across the output of said second means.

14. The apparatus recited in claim 13 wherein said means for supplying said d.c. voltage level further comprises rectifier means for providing said d.c. voltage level to said means for switching in a prescribed polarity.

15. The apparatus recited in claim 1 wherein said means for limiting comprises zener diode means.

16. The apparatus recited in claim 1, further comprising means responsive to said d.c. voltage level for providing said voice signal path.

17. A method for decoding ringing signals on a party telephone line comprising the steps of:
   selectively associating with the telephone instrument connected to the telephone line one of a plurality of different coded ringing signals and supplying a selected one of the ringing signals on the telephone line to the telephone instrument via a ringing signal path provided in the decoding apparatus thereby to activate a ringer of the telephone instrument;
   providing all other signals on the telephone line except for said selected ringing signal to said telephone instrument via a voice signal path provided in the decoding apparatus; and
   preventing ringing signals present on the telephone line from activating the ringer of said telephone instrument via said voice signal path, said step of preventing comprising converting a ringing signal into a direct current signal to which a ringer of the telephone instrument is not responsive;
   decoding said plurality of ringing signals according to the polarity of a d.c. voltage level present across the telephone line upon which the ringing signals are superimposed and according to a grounded state of the telephone line;
   selectively supplying a ringing signal on said ringing signal path or a signal on said voice signal path to said telephone instrument; and
   limiting a change in voltage level on said voice signal path between said d.c. level on said telephone line and a rectified level of the ringing signal voltage.

18. The method recited in claim 17 wherein said ringing signal path comprises a pair of conductors, and further comprising the step of coupling one of said conductors to earth ground for providing a return path to a telephone central office for the ringing signal through earth ground.

19. The method recited in claim 17 wherein said step of supplying comprises rectifying a ringing signal present on the telephone line for activating a switching means and coupling the selected ringing signal to the telephone instrument via the switching means.

20. The method recited in claim 17, further comprising the step of interrupting said voice signal path in response to a ringing signal.

21. The method recited in claim 17 wherein said step of decoding comprises activating first and second switching means in series, whereby only the selected ringing signal will activate said first and second switching means thereby to supply said selected ringing signal to said telephone instrument.

22. The method recited in claim 17 further comprising the step of balancing an impedance across said telephone line when the d.c. voltage level on said telephone lines drops below a preset threshold.

23. The method recited in claim 22 further comprising the step of switching a terminating impedance across said telephone line when the d.c. voltage level on said telephone lines drops below a preset threshold.

* * * * *

UNITED STATES PATENT AND TRADEMARK OFFICE
CERTIFICATE OF CORRECTION

PATENT NO. : 4,761,810
DATED : August 2, 1988
INVENTOR(S) : Steven B. Perry

It is certified that error appears in the above-identified patent and that said Letters Patent is hereby corrected as shown below:

Column 6, line 12, delete "the" (second occurrence);

Column 10, line 12, "made" (first occurrence) should be --may--;

Claim 6, lines 4 and 5, after "for" insert --selectively--;

Claim 19, line 2, after "of" insert --selectively--.

Signed and Sealed this

Fifth Day of September, 1989

Attest:

Attesting Officer

DONALD J. QUIGG

Commissioner of Patents and Trademarks